J. W. HUNTOON.
Corn Husker.

No. 107,378.

Patented Sept. 13, 1870.

Witnesses
Chas Jacobs
J. V. White

Inventor
James W. Huntoon
Per
J. H. Alexander
Atty

UNITED STATES PATENT OFFICE.

JAMES W. HUNTOON, OF WASHINGTON, DISTRICT OF COLUMBIA.

IMPROVEMENT IN COMBINED CORN HUSKER AND SHELLER AND GRAIN THRASHER AND CLEANER

Specification forming part of Letters Patent No. 107,378, dated September 13, 1870.

*To all whom it may concern:*

Be it known that I, JAMES W. HUNTOON, of Washington, District of Columbia, have invented certain new and useful Improvements in Combined Corn-Sheller and Grain-Thrasher; and I do hereby declare that the following is a full, clear, and exact description thereof, reference being had to the accompanying drawings, and to the letters of reference marked thereon, which form a part of this specification.

The nature of my invention consists, first, in the combination of a field corn husker, sheller, thrasher, and cleaner; and, second, in so arranging such a machine upon wheels so constructed and in such a manner that the motion of the wheels will operate the machine while it is being drawn through the corn-field or wheat in swath.

In order to enable others skilled in the art to which my invention appertains to make and use the same, I will now proceed to describe its construction and operation, referring to the annexed drawings, in which—

Figure 1:
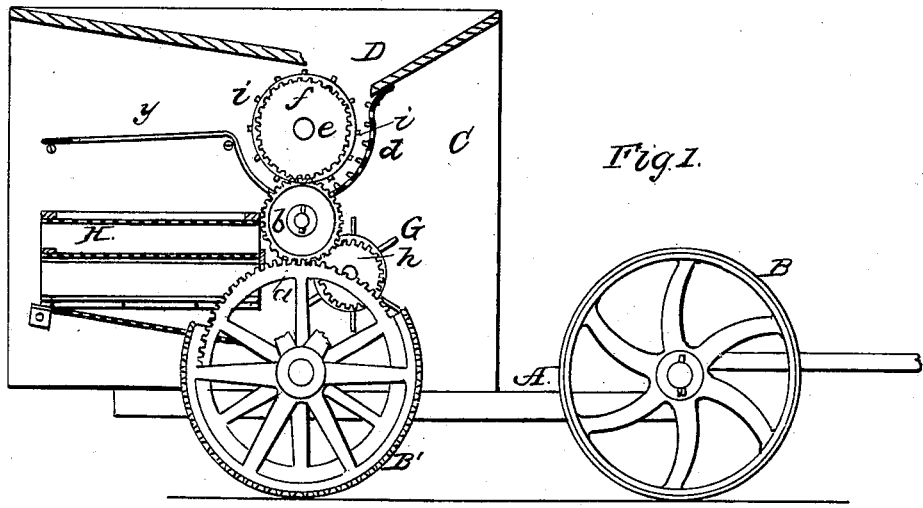
Figure 2:
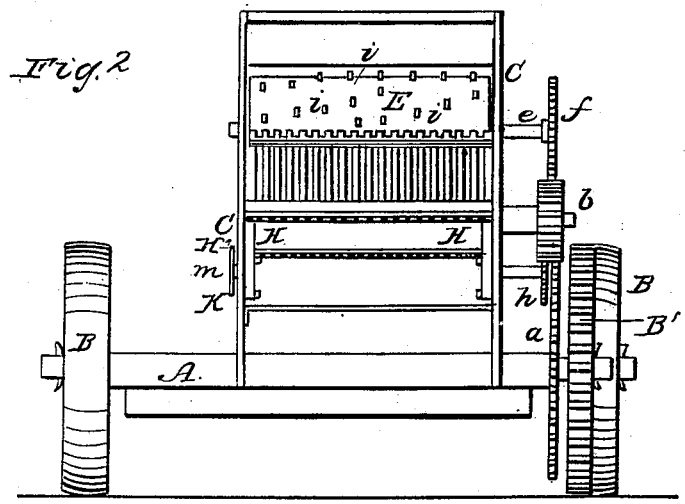

Figure 1 is a side elevation, the side of the machine being removed; and Fig. 2 is an end view of my machine.

A represents a bed-frame, of any suitable construction and dimensions, mounted upon wheels B B'.

One or more of the hind wheels, B', is provided with teeth or projections on its outer periphery, which catch in the ground, so that said wheel or wheels will turn at all times when the machine is drawn forward. On the inner side of the wheels B' is secured a cog-wheel, $a$, which gears with an intermediate cog-wheel or pinion, $b$, mounted upon a shaft or arbor projecting from the side of the frame C, which is placed on the frame A, and contains the machinery.

D is the hopper of the machine, under which is a perforated concave and screen, $d\,y$, struck up or cast in one piece, and in this concave works a hollow cylinder, E, provided with a number of small teeth, $i\,i$.

The cylinder E is mounted upon a shaft, $e$, having its bearings in the sides of the frame C, and provided at one end with a cog-wheel, $f$, which meshes with the pinion $b$, and thus motion is contributed to the cylinder.

In the front end of the machine is placed the fan G, upon the shaft of which, at one end, is also a cog-wheel, $h$, which gears with the same pinion $b$. Upon the other end of the fan-shaft is a crank-wheel, $k$, connected by a rod, $m$, with the shoe H, containing the screens or sieves.

Thus it will be seen that all the various parts of the machine obtain their required motion from one or more of the wheels upon which the frame A is mounted.

The main object of my invention is to provide a means whereby corn may be husked, shelled, and cleaned, or grain thrashed and cleaned, in the field, without the labor and expense of first collecting the same and carrying it to the barn or other place where the machine may be placed. This is fully accomplished by the above-described device.

The machine is driven over the field, and a necessary number of hands are employed to collect the corn or grain when cut, and, throwing it in the hopper D, it is cleaned out while the machine is being drawn forward.

For wheat or other grain, one or more sieves may be added in the shoe H, and then, also, the teeth $i\,i$ are taken out and larger ones substituted.

When desired, the machine may be taken off the bed-frame and operated by horse or other power on the ground, in the ordinary way.

Having thus fully described my invention, what I claim as new, and desire to secure by Letters Patent, is—

1. The combination, in the combined field corn husker and sheller, grain thrasher and cleaner, herein shown, of the slotted and perforated concave and screen $d\,y$, constructed as described.

2. The cylinder E, provided with removable teeth $i\,i$, fan G, shoe H, wheels B and B', cog-wheels $a$, and pinions $h\,b\,f$, when arranged to operate in the manner described and for the purposes set forth.

In testimony that I claim the foregoing as my own I affix my signature in presence of two witnesses.

JAMES W. HUNTOON.

Witnesses:
T. H. ALEXANDER,
J. V. WHITE.